US007866629B2

(12) United States Patent
Harlow et al.

(10) Patent No.: US 7,866,629 B2
(45) Date of Patent: Jan. 11, 2011

(54) GATE VALVE WITH STREAMLINED FLOW

(75) Inventors: Grant Harlow, Amory, MS (US);
Randall Wiggington, Smithville, MS (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 569 days.

(21) Appl. No.: 11/865,813

(22) Filed: Oct. 2, 2007

(65) Prior Publication Data

US 2008/0083899 A1    Apr. 10, 2008

Related U.S. Application Data

(60) Provisional application No. 60/849,431, filed on Oct. 4, 2006.

(51) Int. Cl.
*F16K 25/00* (2006.01)

(52) U.S. Cl. .................. 251/193; 251/176; 251/326

(58) Field of Classification Search .......... 251/159, 251/170, 176, 193, 326, 328
See application file for complete search history.

(56) References Cited

U.S. PATENT DOCUMENTS

| | | | | |
|---|---|---|---|---|
| 2,893,684 | A | * | 7/1959 | Williams et al. ............ 251/328 |
| 2,925,993 | A | | 2/1960 | Downs et al. |
| 3,069,129 | A | | 12/1962 | Grove |
| 3,107,685 | A | | 10/1963 | Scaramucci |
| 3,905,576 | A | | 9/1975 | Fox |
| 4,062,516 | A | * | 12/1977 | Grove ....................... 251/174 |
| 4,124,194 | A | | 11/1978 | Alvarez |
| 4,179,099 | A | | 12/1979 | Pierce |
| 4,262,688 | A | | 4/1981 | Bialkowski |
| 4,281,819 | A | | 8/1981 | Linder |
| 4,363,465 | A | | 12/1982 | Morrill |
| 4,377,273 | A | | 3/1983 | Beson |
| 4,377,274 | A | * | 3/1983 | Mayhew, Jr. ................ 251/327 |
| 4,401,292 | A | | 8/1983 | Whaley |
| 4,471,943 | A | | 9/1984 | Nelson |
| 4,486,003 | A | | 12/1984 | Meyer et al. |
| 4,489,918 | A | | 12/1984 | Kalsi |
| 4,515,347 | A | | 5/1985 | Sitton et al. |
| 4,519,583 | A | | 5/1985 | Lapinoja |
| 4,541,449 | A | | 9/1985 | Burke et al. |
| 4,577,834 | A | | 3/1986 | Oliver |
| 4,643,395 | A | | 2/1987 | Williams |
| 4,658,848 | A | | 4/1987 | Meyer et al. |
| 4,688,597 | A | | 8/1987 | Clarkson et al. |
| 4,771,805 | A | | 9/1988 | Maa |

(Continued)

FOREIGN PATENT DOCUMENTS

CA    2068435    11/1992

(Continued)

*Primary Examiner*—John K Fristoe, Jr.
(74) *Attorney, Agent, or Firm*—RatnerPrestia

(57) ABSTRACT

A gate valve comprising a valve body including at least a first seat adjacent to a groove. A gate is slideably carried in the valve body for movement between an open position wherein the gate is spaced from the at least one seat and a closed position wherein a portion of the gate is positioned within the groove and the gate is sealingly engaged with the at least one seat. A bridging member is biasedly positioned within the groove and is configured to substantially bridge the groove when the gate is in the open position.

20 Claims, 2 Drawing Sheets

U.S. PATENT DOCUMENTS

| | | |
|---|---|---|
| 4,824,074 A | 4/1989 | Baugh |
| 4,909,272 A * | 3/1990 | Carpentier .................. 137/240 |
| 5,014,730 A | 5/1991 | Fye |
| 5,020,776 A | 6/1991 | Owens et al. |
| 5,037,064 A | 8/1991 | Pond |
| 5,082,247 A | 1/1992 | Owens et al. |
| 5,083,582 A | 1/1992 | Lawson |
| 5,090,661 A | 2/1992 | Parks et al. |
| 5,154,397 A | 10/1992 | Thomas et al. |
| 5,201,872 A | 4/1993 | Dyer |
| 5,338,006 A | 8/1994 | McCutcheon et al. |
| 5,370,149 A | 12/1994 | Clarkson et al. |
| 5,413,140 A * | 5/1995 | Kimpel et al. .............. 137/375 |
| 5,582,200 A | 12/1996 | Kimpel et al. |
| 5,727,775 A | 3/1998 | Rodger et al. |
| 5,762,089 A | 6/1998 | Haeberle et al. |
| 5,890,700 A | 4/1999 | Clarkson et al. |
| 5,971,358 A | 10/1999 | Kennedy |
| 6,254,060 B1 | 7/2001 | Kennedy |
| 6,260,822 B1 | 7/2001 | Puranik |
| 6,422,535 B1 | 7/2002 | Stone et al. |
| 6,745,999 B1 | 6/2004 | Heinecke et al. |
| 6,923,423 B2 | 8/2005 | Jones et al. |
| 6,959,912 B2 * | 11/2005 | Reeves et al. ............... 251/214 |
| 7,350,766 B2 * | 4/2008 | Comstock et al. ........... 251/328 |
| 2004/0124393 A1 | 7/2004 | Shimomura |
| 2006/0043327 A1 | 3/2006 | Hunter |
| 2006/0091347 A1 | 5/2006 | McGuire et al. |
| 2006/0175572 A1 | 8/2006 | Syvertsen |
| 2006/0219973 A1 | 10/2006 | Hoeptner |

FOREIGN PATENT DOCUMENTS

| | | |
|---|---|---|
| CA | 2102488 A1 | 7/1994 |
| CA | 2258065 | 7/1999 |
| CA | 2274238 | 12/2004 |
| GB | 2272271 | 5/1994 |
| GB | 2340917 | 3/2000 |
| WO | WO 02095273 | 11/2002 |

* cited by examiner

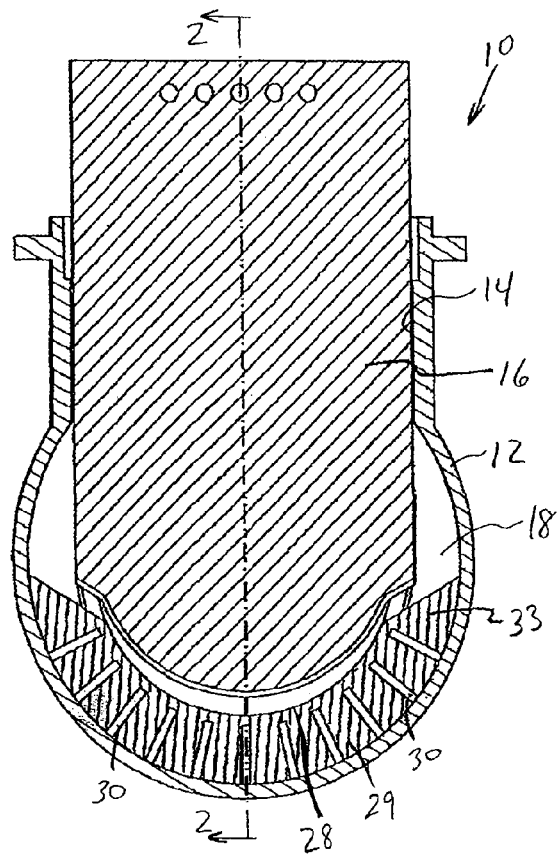
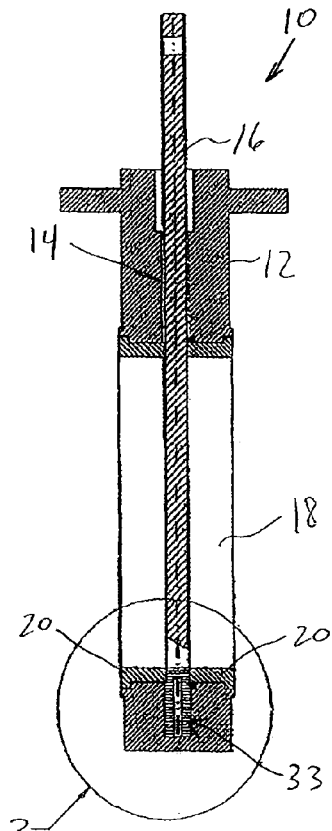
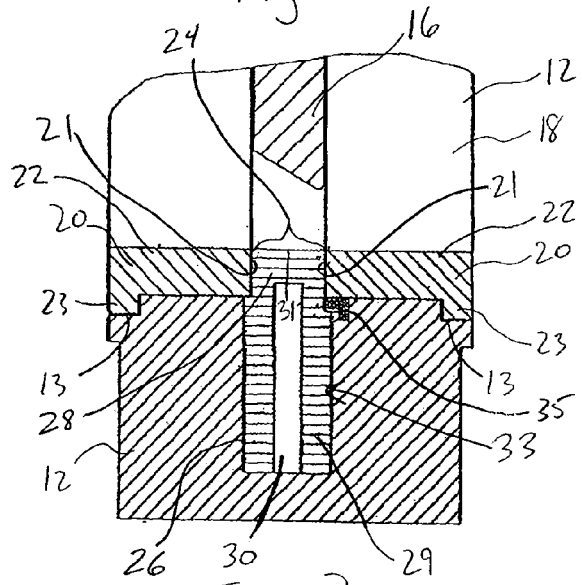
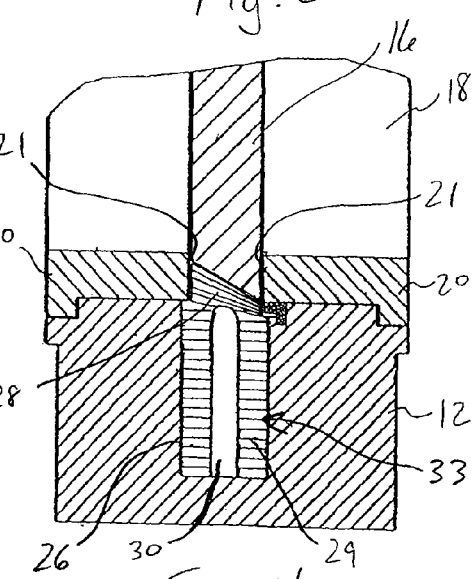
Fig. 1
Fig. 2
Fig. 3
Fig. 4

US 7,866,629 B2

GATE VALVE WITH STREAMLINED FLOW

FIELD OF THE INVENTION

This invention relates to gate valves and, more particularly, to gate valves in which the valve seat is perpendicular to the flow path of the fluid.

BACKGROUND OF THE INVENTION

Gate valves are well known in the art and have the advantage of providing an unobstructed flow path. In certain gate valves, the valve seat arrangement includes a groove formed between two seat members and, in the closed position of the valve, the gate sits in the groove and seals against the seat members.

Turbulence can be induced in the fluid flowing through the valve by changes in the radius of the waterway. Changes in the radius can be caused by the build up of solid material in the groove between the seats.

SUMMARY OF THE INVENTION

The present invention relates to a gate valve comprising a valve body including at least a first seat adjacent to a groove. A gate is slideably carried in the valve body for movement between an open position wherein the gate is spaced from the at least one seat and a closed position wherein a portion of the gate is positioned within the groove and the gate is sealingly engaged with the at least one seat. A bridging member is biasedly positioned within the groove and is configured to substantially bridge the groove when the gate is in the open position.

In one embodiment, the groove is formed by the space formed between two metal valve seat members and the gate seals against these valve seat members when its in the closed position.

BRIEF DESCRIPTION OF THE DRAWINGS

FIG. 1 is a cross-sectional view of a gate valve in accordance with an exemplary embodiment of this invention;

FIG. 2 is a cross-sectional view taken along the line 2-2 of FIG. 1;

FIG. 3 is an enlarged view of the circled portion of FIG. 2 illustrating the valve in an open position;

FIG. 4 is an enlarged view similar to FIG. 3 illustrating the valve in a closed position;

DETAILED DESCRIPTION OF THE INVENTION

Figure 5:
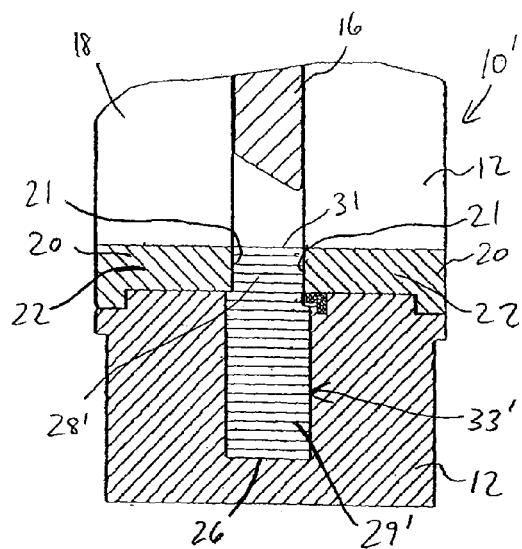
FIG. 5 is an enlarged view illustrating another exemplary embodiment of the invention.

Although the invention is illustrated and described herein with reference to specific embodiments, the invention is not intended to be limited to the details shown. Rather, various modifications may be made in the details within the scope and range of equivalents of the claims and without departing from the invention.

Referring first to FIGS. 1-4, there is shown a gate valve 10 in accordance with an exemplary embodiment of this invention. The gate valve 10 includes a valve body 12 of any suitable configuration. At one end, the valve body includes a slot 14 that slideably carries a gate 16. In this embodiment, the gate 16 is a knife gate. The valve body 12 is formed at its other end with an opening 18 through which fluid flows when the gate 16 is in its open position. The opening 18 is illustrated with a circular configuration, but may have other configurations.

A pair of valve seats 20 are carried in the valve body 12 and define opposed valve seat surfaces 21 along their respective axially inward surfaces. Each of the valve seat surfaces 21 extends substantially perpendicular to the direction of travel of the fluid traveling through the opening 18. As illustrated in FIG. 4, when the gate 16 is in the closed position, the gate 16 engages both valve seat surfaces 21. While the illustrated embodiment shows a pair of valve seats 20, with the gate 16 engaging both valve seat surfaces 21, the invention may include only a single seat with which the gate 16 engages.

In the present embodiment, each seat 20 includes an axially extending cylindrical sleeve 22 that extends inwardly from an adjacent outer surface of the valve body 12. Each seat 20 of the present embodiment includes a shoulder 23 opposite the seat surface 21. The shoulders 23 are configured to engage corresponding grooves 13 along the outer surfaces of the valve body 12 to maintain the position of the valve seats 20 relative to the valve body 12. The seats 20 can be made of any suitable material, preferably metal. While the seats 20 are illustrated as separate components carried by the valve body 12, one or both of the seats 20 may alternatively be made integrally with the valve body 12.

Referring to FIGS. 3 and 4, the sleeves 22 are of a length that such that their free ends which define the seat surfaces 21 are spaced apart and form a groove 24 that is axially aligned with the slot 14. Thus, the gate 16 is slideable between an open position, as shown in FIG. 3, wherein the gate 16 is out of the groove 24 and a closed position, as shown in FIG. 4, wherein a portion of the gate 16 sits in the groove 24 in sealing engagement with the seat surfaces 21 of the seats 20. While the gate 16 is illustrated in FIG. 3 in an open position only slightly removed from groove 24, the gate 16 is preferably moveable along the slot 14 over a full range of motion between the closed position and a completely open position wherein the gate 16 is completely clear of the opening 18.

Extending radially outwardly from the groove 24 is a housing chamber 26. The housing chamber 26 may extend over the circumferential length of the groove 24 or only a portion thereof, for example, as a series of smaller chambers.

A bridging member 28 is positioned within and substantially fills the width of the groove 24 such that the bridging member 28 substantially bridges between the seat surfaces 21 of the seats 20. At least one biasing member 29 is positioned in the chamber 26 and biases the bridging member 28 radially inward such that the radially inner surface 31 of the bridging member 28 is substantially radially aligned with the radially inner surfaces of the sleeves 22 so that the flow path through the valve is relatively smooth.

In the present embodiment, the bridging member 28 and the biasing member 29 are formed as a unitary structure in the form of a compressible ring 33. The compressible ring 33 can be made from various materials including rubber or other resilient materials. Furthermore, the compressible ring 33 may be manufactured as a homogeneous structure from a single material or may be manufactured from more than one material. Referring to FIG. 3, a snap ring 35 or the like may be configured to engage a portion of the compressible ring 33 to maintain the ring 33 within the groove 24 and chamber 26.

Referring to FIG. 4, as the gate 16 is moved to the closed position, a portion of the gate 16 enters the groove 24 and compresses the compressible ring 33. The gate 16 slides into the groove 24 in sealing engagement with the seat surfaces 21 of the sleeves 22. As shown in FIGS. 1-4, the ring 33 can be formed with voids 30 to facilitate its compression. In this embodiment, the voids 30 are radially extending slots extending from the outer diameter toward the inner diameter of the ring 33. Other configurations can be used. Alternatively, as illustrated in the alternative gate valve 10' of FIG. 5, the compressible ring 33' may be formed as a solid component, without any voids in the bridging member 28' or biasing member 29'. In all other aspects, the gate valve 10' of FIG. 5 is the same as in the previous embodiment and like elements are numbered alike.

As the gate 16 is moved from the closed position of FIG. 4 toward the open position as illustrated in FIG. 3, the gate 16 exits the groove 24 and the bridging member 28 and biasing member 29 of the compressible ring 33 begin to uncompress until the radially inner surface 31 of the bridging member 28 again is substantially radially aligned with the radially inner surfaces of the sleeves 22 so that the flow path through the valve 10 is relatively smooth.

Figure 6:
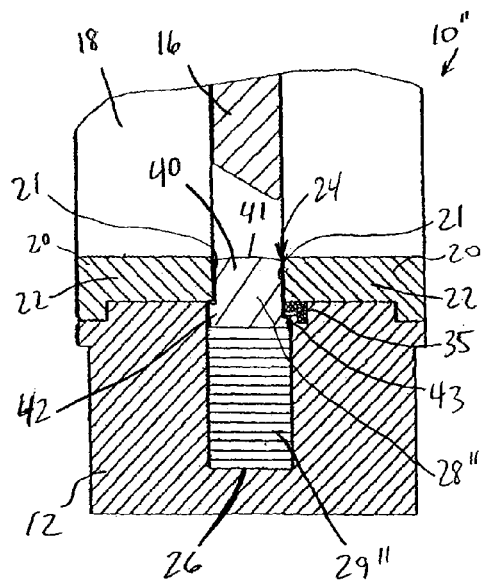
FIG. 6 is an enlarged view illustrating another exemplary embodiment of the invention in an open position.
Figure 7:
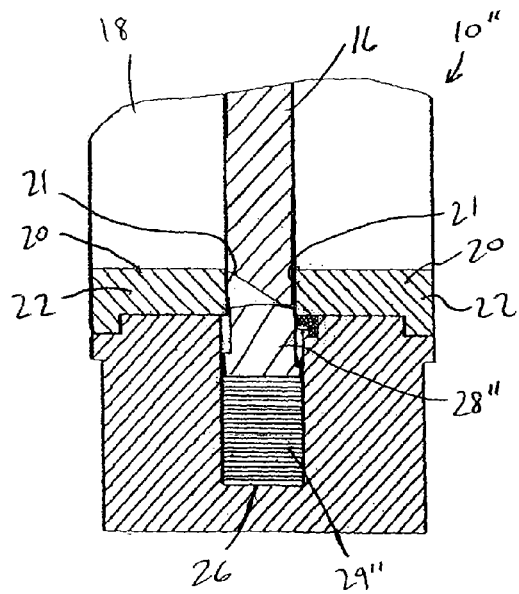
FIG. 7 is an enlarged view of the valve of FIG. 6 illustrating the valve in a closed position.

Referring to FIGS. 6 and 7, a gate valve 10" that is another exemplary embodiment of the present invention will be described. The gate valve 10" is substantially the same as in the previous embodiment, except that the bridging member 28" and the biasing member 29" are separate components. In the present embodiment, the bridging member 28" is made from an incompressible material, for example, but not limited to, urethane, and the biasing member 29" is made from a compressible material, for example, rubber, neoprene or any suitable elastomeric material. While the bridging member 28" is described as incompressible, the invention is not limited to such and both of the members 28" and 29" can be made from various materials of different hardness or compressibility. In the present embodiment, the biasing member 29" is a compressible block or the like. The biasing member 29" may be provided with voids or the like to assist compression.

Figure 8:
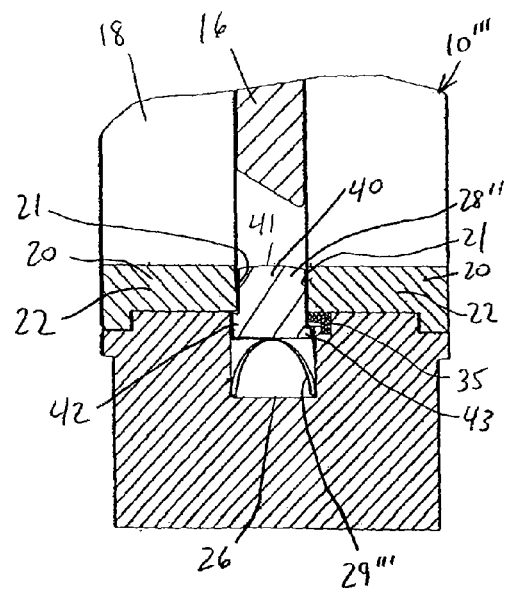
FIG. 8 is an enlarged view illustrating another exemplary embodiment of the invention.

Alternatively, as illustrated in the alternative gate valve 10''' of FIG. 8, the biasing member 29''' may be a spring component or the like. In this illustrated embodiment, the biasing member 29''' is a leaf spring extending the circumferential length of the chamber 26. Alternatively, a plurality of radially oriented compression springs (not shown) may be positioned in respective chambers. In all other aspects, the gate valve 10''' of FIG. 8 is the same as in the previous embodiment and like elements are numbered alike.

Referring again to FIGS. 6 and 7, the bridging member 28" has a circumferentially extending body 40 having a radially inner surface 41 with a width substantially equal to the width of the groove 24. The bridging member 28" is positioned in the groove 24 and chamber 26 and is biased radially inward by the biasing member 29". The bridging member 28" preferably has shoulders 42 and 43 extending from the body 40 to guide movement of the bridging member 28" within the chamber 26. At least one of the shoulders 42 is configured to engage a respective sleeve 22 to limit the radially inward movement of the bridging member 28". The other shoulder 43 may engage a snap-ring 35 or the like to retain the bridging member 28" within the valve body 12. Various other structures may be provided and the invention is not limited to the illustrated arrangement.

Referring to FIG. 7, as the gate 16 is moved to the closed position, a portion of the gate 16 enters the groove 24 and contacts the bridging member 28". The gate 16 forces the bridging member 28" radially outward against the biasing force of the biasing member 29". In the present embodiment, the biasing member 29" is compressed as the gate 16 moves to the closed position. The gate 16 slides into the groove 24 in sealing engagement with the seat surfaces 21 of the sleeves 22.

As the gate 16 is moved from the closed position of FIG. 7 toward the open position as illustrated in FIG. 6, the gate 16 exits the groove 24 and the biasing member 29" begins to uncompress, thereby biasing the bridging member 28" radially inward until the radially inner surface 41 of the bridging member 28" again is substantially radially aligned with the radially inner surfaces of the sleeves 22 so that the flow path through the valve 10 is relatively smooth.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A gate valve comprising:
a valve body including at least a first seat adjacent to a groove;
a gate slideably carried in the valve body for movement between an open position wherein the gate is spaced from the at least one seat and a closed position wherein a portion of the gate is positioned within a receiving portion of the groove and the gate is sealingly engaged with the at least one seat; and
a bridging member biasedly positioned within the groove and configured to substantially bridge and substantially fill the receiving portion of the groove when the gate is in the open position.

2. The gate valve of claim 1 wherein the at least one seat defines a seat surface that engages a portion of the gate when the gate is in the closed position.

3. The gate valve of claim 2 wherein the seat surface extends substantially perpendicular to a direction of fluid flow through the valve.

4. The gate valve of claim 1 wherein the valve body includes two seats which define opposed seat surfaces on opposite sides of the groove, the seat surfaces each engaging a portion of the gate when the gate is in the closed position.

5. The gate valve of claim 4 wherein the seat surfaces extend substantially perpendicular to a direction of fluid flow through the valve.

6. The gate valve of claim 4 wherein the bridging member substantially bridges between the opposed seat surfaces when the gate is in the open position.

7. The gate valve of claim 4 wherein each of the seats has a radially inner surface and the bridging member has a radially inner surface that is substantially radially aligned with the seat inner surfaces when the gate is in the open position.

8. The gate valve of claim 1 wherein the at least one seat is manufactured from metal.

9. The gate valve of claim 1 wherein the at least one seat includes an axially extending cylindrical seat.

10. The gate valve of claim 1 wherein the at least one seat is formed integrally with the valve body.

11. The gate valve of claim 1 wherein the bridging member is biased radially inward by a biasing member carried in the valve body.

12. The gate valve of claim 11 wherein the biasing member is positioned within a housing chamber defined in the valve body and extending radially outward from the groove.

13. The gate valve of claim 11 wherein the bridging member and the biasing member are formed as a unitary structure.

14. The gate valve of claim 13 wherein the bridging member and the biasing member are defined by a compressible ring.

15. The gate valve of claim 14 wherein the compressible ring includes internal voids.

16. The gate valve of claim 14 wherein the compressible ring is manufactured from a resilient material.

17. The gate valve of claim 11 wherein the bridging member and the biasing member are formed as separate components.

18. The gate valve of claim 17 wherein the bridging member is manufactured from an incompressible material and the biasing member is manufactured from a compressible material.

19. The gate valve of claim 18 wherein the biasing member includes a block of elastomeric material.

20. The gate valve of claim 18 wherein the biasing member includes at least one spring member.

* * * * *